US008744959B2

(12) United States Patent
Smith et al.

(10) Patent No.: US 8,744,959 B2
(45) Date of Patent: Jun. 3, 2014

(54) ELECTRONIC BILL PAYMENT WITH VARIABLE PAYMENT OPTIONS

(75) Inventors: Gordon Smith, Littleton, CO (US);
Terry Wallace, Silver Bow, MT (US);
Emiko Gordon, Westminster, CO (US);
Matt Canetto, Centennial, CO (US)

(73) Assignee: MoneyGram International, Inc., Minneapolis, MN (US)

( * ) Notice: Subject to any disclaimer, the term of this patent is extended or adjusted under 35 U.S.C. 154(b) by 654 days.

(21) Appl. No.: 12/191,112

(22) Filed: Aug. 13, 2008

(65) Prior Publication Data

US 2010/0042537 A1    Feb. 18, 2010

(51) Int. Cl.
*G06Q 30/04* (2012.01)

(52) U.S. Cl.
USPC .............................................. 705/40; 705/39

(58) Field of Classification Search
None
See application file for complete search history.

(56) References Cited

U.S. PATENT DOCUMENTS

| | | | |
|---|---|---|---|
| 4,385,285 A | 5/1983 | Horst et al. |
| 4,913,295 A | 4/1990 | Murphy et al. |
| 4,948,174 A | 8/1990 | Thomson et al. |
| 5,119,293 A | 6/1992 | Hammond |
| 5,121,945 A | 6/1992 | Thomson et al. |
| 5,326,960 A | 7/1994 | Tannenbaum |
| 5,347,302 A | 9/1994 | Simonoff |
| 5,350,906 A | 9/1994 | Brody et al. |
| 5,354,161 A | 10/1994 | Chiba et al. |
| 5,420,405 A | 5/1995 | Chasek |
| 5,470,160 A | 11/1995 | Nowlin |
| 5,484,988 A | 1/1996 | Hills et al. |
| 5,504,677 A | 4/1996 | Pollin |
| 5,650,604 A | 7/1997 | Marcous et al. |
| 5,652,421 A | 7/1997 | Veeneman et al. |
| 5,659,165 A | 8/1997 | Jennings et al. |
| 5,678,937 A | 10/1997 | Smith |
| 5,727,249 A | 3/1998 | Pollin |
| 5,774,879 A | 6/1998 | Custy et al. |
| 5,825,003 A | 10/1998 | Jennings et al. |
| 5,878,211 A | 3/1999 | Delagrange et al. |
| 5,897,625 A | 4/1999 | Gustin et al. |

(Continued)

FOREIGN PATENT DOCUMENTS

GB    2370146 A    6/2002

OTHER PUBLICATIONS

Gamble, Richard, Electronic billing gets a test, Treasury & Risk Management, Oct. 1998, vol. 8, Issue 8, p. 53, 2 p.*

(Continued)

*Primary Examiner* — Rajesh Khattar
*Assistant Examiner* — Carol See
(74) *Attorney, Agent, or Firm* — Dorsey & Whitney LLP

(57) ABSTRACT

A system for third party bill payment services used by a payer to pay a biller with whom a payer has an account includes a third party computer system for accessing biller data, the biller data for the payer comprising at least one account identifier, an amount due, and a nominal bill due date; a payment option generator for developing at least one payment option wherein the payment specified is responsive to a difference between a proposed payment date and the nominal bill due date; a payer interface for presenting the at least one payment option to the payer and for accepting a payer option selection and a payment funding confirmation; and a payment execution controller responsive to the payer option selection and funding confirmation, for initiating payment to a biller account on behalf of the payer.

22 Claims, 10 Drawing Sheets

(56) References Cited

U.S. PATENT DOCUMENTS

| | | | |
|---|---|---|---|
| 5,909,673 A | 6/1999 | Gregory | |
| 5,925,865 A | 7/1999 | Steger | |
| 5,956,700 A | 9/1999 | Landry | |
| 5,963,647 A | 10/1999 | Downing et al. | |
| 5,965,862 A | 10/1999 | Momose | |
| 5,966,698 A | 10/1999 | Pollin | |
| 5,987,439 A | 11/1999 | Gustin et al. | |
| 5,997,192 A | 12/1999 | Martinez et al. | |
| 6,012,048 A | 1/2000 | Gustin et al. | |
| 6,038,553 A | 3/2000 | Hyde, Jr. | |
| 6,039,250 A | 3/2000 | Ito et al. | |
| 6,041,315 A | 3/2000 | Pollin | |
| 6,173,272 B1 | 1/2001 | Thomas et al. | |
| 6,267,292 B1 | 7/2001 | Walker et al. | |
| 6,317,745 B1 | 11/2001 | Thomas et al. | |
| 6,408,203 B2 | 6/2002 | Mackin | |
| 6,488,203 B1 | 12/2002 | Stoutenburg et al. | |
| 6,502,747 B1 | 1/2003 | Stoutenburg et al. | |
| 6,505,170 B1 | 1/2003 | Seifert et al. | |
| 6,547,132 B1 | 4/2003 | Templeton et al. | |
| 6,554,184 B1 | 4/2003 | Amos | |
| 6,609,113 B1 | 8/2003 | O'Leary et al. | |
| 6,736,314 B2 | 5/2004 | Cooper et al. | |
| 6,761,309 B2 | 7/2004 | Stoutenburg et al. | |
| 6,769,605 B1 | 8/2004 | Magness | |
| 6,814,282 B2 | 11/2004 | Seifert et al. | |
| 6,827,260 B2 | 12/2004 | Stoutenburg et al. | |
| 6,829,588 B1 | 12/2004 | Stoutenburg et al. | |
| 6,886,742 B2 | 5/2005 | Stoutenburg et al. | |
| 6,938,013 B1 | 8/2005 | Gutierrez-Sheris | |
| 7,120,608 B1 | 10/2006 | Gallagher et al. | |
| 7,258,268 B2 | 8/2007 | Steiger, Jr. | |
| 2001/0051919 A1* | 12/2001 | Mason | 705/40 |
| 2002/0082962 A1 | 6/2002 | Farris et al. | |
| 2002/0116331 A1* | 8/2002 | Cataline et al. | 705/39 |
| 2003/0083987 A1 | 5/2003 | Stoutenburg et al. | |
| 2003/0110129 A1 | 6/2003 | Frazier et al. | |
| 2003/0169881 A1 | 9/2003 | Niedermeyer | |
| 2003/0191711 A1* | 10/2003 | Jamison et al. | 705/40 |
| 2003/0208439 A1 | 11/2003 | Rast | |
| 2003/0222135 A1 | 12/2003 | Stoutenburg et al. | |
| 2003/0233278 A1* | 12/2003 | Marshall | 705/14 |
| 2004/0143552 A1 | 7/2004 | Weichert et al. | |
| 2004/0177014 A1 | 9/2004 | Cowell | |
| 2005/0209958 A1 | 9/2005 | Michelsen et al. | |
| 2006/0054683 A1 | 3/2006 | Michelsen et al. | |
| 2006/0206421 A1 | 9/2006 | Knapp | |
| 2007/0005498 A1 | 1/2007 | Cataline et al. | |
| 2007/0239601 A1* | 10/2007 | Ganesan et al. | 705/40 |
| 2008/0010215 A1* | 1/2008 | Rackley, III et al. | 705/70 |
| 2008/0033877 A1 | 2/2008 | Blair et al. | |
| 2008/0114697 A1 | 5/2008 | Black et al. | |
| 2009/0089193 A1* | 4/2009 | Paintin | 705/34 |

OTHER PUBLICATIONS

MoneyGram International, Inc. MoneyGram® eMoney Transfer. Printout of computer screen images of product electronic commerce documents. 1995. 109 pages.

Western Union—First Data Corp.—IPS Card Solutions, "FDX-400 Remote Payroll Distribution", 1998, 1-page, obtain from the patent application file for Stoutenburg et al., Pat. No. 6,829,588.

Making the most of financial services, Anonymous, Apr. 1996, Progressive Grocer, pp. 75, 77 and 78.

Sample Contracts—Money Transfer Agreement—Travelers Express Co. Inc, Jun. 20, 2000, pp. 1-9.

Sample Contracts—Money Order Agreement—Travelers Express Co. Inc, Apr. 16, 1998, pp. 1-3.

ATMs: More than meets the eye, Beckie Kelly, Dec 1998, National Petroleum News (NPN), pp. 26-28 and 31-32.

Adding Muscle to your ATM services, Leigh Gregg, Credit Union Executive Journal, May/Jun. 1998, pp. 31-32, 34 and 36.

* cited by examiner

Biller Data 32

| | 210 | 220 | 230 | 240 | 250 |
|---|---|---|---|---|---|
| BillerA<br>-name & address<br>-biller ID no.<br>-other ID/data | Payer Acct. Recs. 34A<br>-PayerA1<br>-PayerA2<br><br>-Payer An | Payment Rules 36A | Fee & Settlement Rules<br>38A<br>timing/frequency<br>payment method<br>accounts used | Biller Payment Records<br>39A |
| BillerB<br>-name & address<br>-biller ID no.<br>-other ID/data | Payer Acct. Recs. 34B<br>-PayerB1<br>-PayerB2<br><br>-Payer Bn | Payment Rules 36B | Fee & Settlement Rules<br>38B<br>timing/frequency<br>payment method<br>accounts used | Biller Payment Records<br>39B |
| . . . | | | | |
| BillerN<br>-name & address<br>-biller ID no.<br>-other ID/data | Payer Acct. Recs. 34N<br>-PayerN1<br>-PayerN2<br><br>-Payer Nn | Payment Rules 36N | Fee & Settlement Rules<br>38N<br>timing/frequency<br>payment method<br>accounts used | Biller Payment Records<br>39N |

| Payment Window 410a | Fee 420a | Principal 430a | Other Action 440a | Individual Action 450a | Biller-FI Fee Rules 460a |
|---|---|---|---|---|---|
| Early payment | $5 | 2% discount from bill | | | Full Fee to FI; bill amount as discounted to biller |
| On-time payment | $5 | Per bill | $5 credit on account | | Full Fee to FI; bill amount to biller |
| Urgent payment | $10 | Per bill | | | $8 Fee to FI; $2 fee and bill amount to biller |
| Excused Late payment | $10 plus $5 | Per bill | | Review pmt. hist. for no. of past on time pmts. | $10 Fee to FI; $5 fee and bill amount to biller |
| Late over 5 days payment | $10 plus $10 | Per bill plus X% computed interest | $5 credit on account | | $10 Fee to FI; $10 fee and bill amount w/ interest to biller |
| Late over 30 payment | $10 plus $15 | Per bill plus X% computed interest | | | $10 Fee to FI; $15 fee and bill amount w/ interest to biller |
| Late over 60 payment | $10 plus $20 | Per bill plus X% computed interest | | | $15 Fee to FI; $15 fee and bill amount w/ interest to biller |
| Late over 90 payment | $10 plus $25 | Per bill plus X% computed interest | Waive late payment | | $15 Fee to FI; $20 fee and bill amount w/ interest to biller |
| Late over 120 payment | $10 plus $30 | Per bill plus X% computed interest waived | Close account | | $10 Fee to FI; $30 fee and bill amount to biller |

| Payment Window 410b | Fee 420b | Principal 430b | Other Action 440b | Individual Action 450b | Biller-FI Fee Rules 460b |
|---|---|---|---|---|---|
| Early payment | $5 | 2% discount from bill | $5 credit on account | | Full Fee to FI; bill amount as discounted to biller |
| Normal payment | $10 | Per bill | | | Full Fee to FI; bill amount to biller |
| Urgent payment | $20 | Per bill | | | $15 Fee to FI; $5 fee and bill amount to biller |
| Excused Late payment | $21 | Per bill | | Review pmt. hist. for no. of past on time pmts. | $11 Fee to FI; $10 fee and bill amount to biller |
| Late payment w/ interest | $30 | Per bill plus X% computed interest | | | F% of total payment to FI; balance to to biller |
| Late payment, discount and close account | $30 | Y% discount from bill | | Close account | F% of total payment to FI; balance to to biller |

FIG. 6

Biller-Payer Account Record 634

| Account No. 610 | 123456 |
|---|---|
| Customer name/contacts 612 | Jackie Customer; address; tel. no.; e-mail address |
| FI status – loyalty program 614 | Level 1 |
| Current Balance amount 620 | $100 |
| Nominal bill due date 622 | August 1, 2008 |
| Detail of Current balance 630 | Principal $100; interest $0; late fees $0 |
| Payment history 632 | [dates, payments, ontime/late] |
| Settlement offer history 634 | [dates, amounts] |
| Collection analyst recommendation code 636 | [defer; discount; write off; other] |
| Stop code 640 | [accept; reject if not exact; reject all] |
| Prepay code 642 | [accept; accept with limit; reject] |

FIG. 7

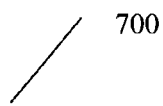

| Account Management for ABC Company | |
| --- | --- |
| Available Payment Option Rule Sets 710 | Status 712 |
| Set A | Selected |
| Set B | Available for selection |
| Set C | Under development (view only) |

Parameters for Selected Payment Option Rule Set 720

| For Option Payment Rule Set A 722 | Current Values | New Values |
| --- | --- | --- |
| Early payment window range 724 | 30 to 15 days before nominal due date | 30 to 20 days before nominal due date |
| Early payment window discount rate 726 | 2% | 2.5% |
| Late over 5 less than 30 account credit 728 | $5 | $0 |

Report Request 730

| Time periods | Report Type (or description) | Request Delivery Date |
| --- | --- | --- |
| May 2007 | Standard | August 1, 2007 |
| 1Q 2007 | Standard plus month subtotals | August 1, 2007 |
| 1Q 2007 | Prepayment refusals | July 15, 2007 |
| July 1, 2007 | Payment transactions | July 7, 2007 |

ELECTRONIC BILL PAYMENT WITH VARIABLE PAYMENT OPTIONS

BACKGROUND OF THE INVENTION

The present invention relates to a system and method for bill payment. More specifically, the present invention relates to a system and method for bill payment with variable payment options.

It is increasingly common for funds to be transferred electronically. This can occur from individual to individual, from business to business, or between an individual and a business. The transfers may occur within one country or across borders, and thus may involve a currency change.

In some money transfer systems initiated by individuals, such transfers may be handled as one-time transactions funded with cash. In some cases this is because the individual sending the funds lacks an account at a bank or a credit card. Thus, the funds for each transfer are provided in cash (or equivalent), paid separately before each transaction. Non-bank financial institutions perform such transfers for persons who are "unbanked".

In the context of transfers from an individual to a business or business to business, funds may be electronically transferred in response to a bill issued and outstanding, such that the payer uses a money transfer to effect bill payment on a bill due to the business. Non-bank financial institutions with money transfer systems may perform bill payment for persons who are "unbanked".

BRIEF SUMMARY OF THE INVENTION

A system for third party bill payment services used by a payer to pay a biller with whom a payer has an account is provided. The system comprises: a third party computer system for accessing biller data, the biller data for the payer comprising at least one account identifier, an amount due, and a nominal bill due date; a payment option generator for developing at least one payment option wherein the payment specified is responsive to a difference between a proposed payment date and the nominal bill due date; a payer interface for presenting the at least one payment option to the payer and for accepting a payer option selection and a payment funding confirmation; and a payment execution controller responsive to the payer option selection and funding confirmation, for initiating payment to a biller account on behalf of the payer In another embodiment, a method for third party bill payment services is provided. The method is used by a payer to pay a biller with whom a payer has an account and comprises: receiving from a payer at a third party computer system information including at least a biller identification, a proposed payment amount, a proposed payment date, and a nominal bill due date; verifying at least a portion of the received information against payer account records; calculating a difference between the proposed payment date and the nominal bill due date; and generating and presenting to the payer at least one payment option in which the payment required is responsive to the calculated difference and stored payment option rules for the biller.

In yet a further embodiment, a computer readable medium encoded with computer program instructions for performing third party bill payment services is provided. The computer readable medium is encoded with computer program instructions for a third party computer system for performing third party bill payment services to pay a biller with whom a payer has an account, comprising: an instruction module for accessing biller data, the biller data for the payer comprising at least one account identifier, an amount due, and a nominal bill due date; an instruction module for a payment option generator for developing at least one payment option wherein the payment specified is responsive to a difference between a proposed payment date and the nominal bill due date; an instruction module for a payer interface for presenting the at least one payment option to the payer and for accepting a payer option selection and a payment funding confirmation; and an instruction module for a payment execution controller responsive to the payer option selection and funding confirmation, for initiating payment to a biller account on behalf of the payer.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

FIG. 2 is a table showing biller data types in accordance with one embodiment.

FIG. 4A is a table showing a hypothetical example of payment windows and associated payment option data.

FIG. 4B is a table showing an alternate hypothetical example of payment windows and associated payment option data.

FIG. 6 is a data diagram showing an example of a biller data record for a customer who may become a payer using the present system.

FIG. 7 is a schematic screen layout for a screen of the biller account management portal.

DETAILED DESCRIPTION

Figure 1:
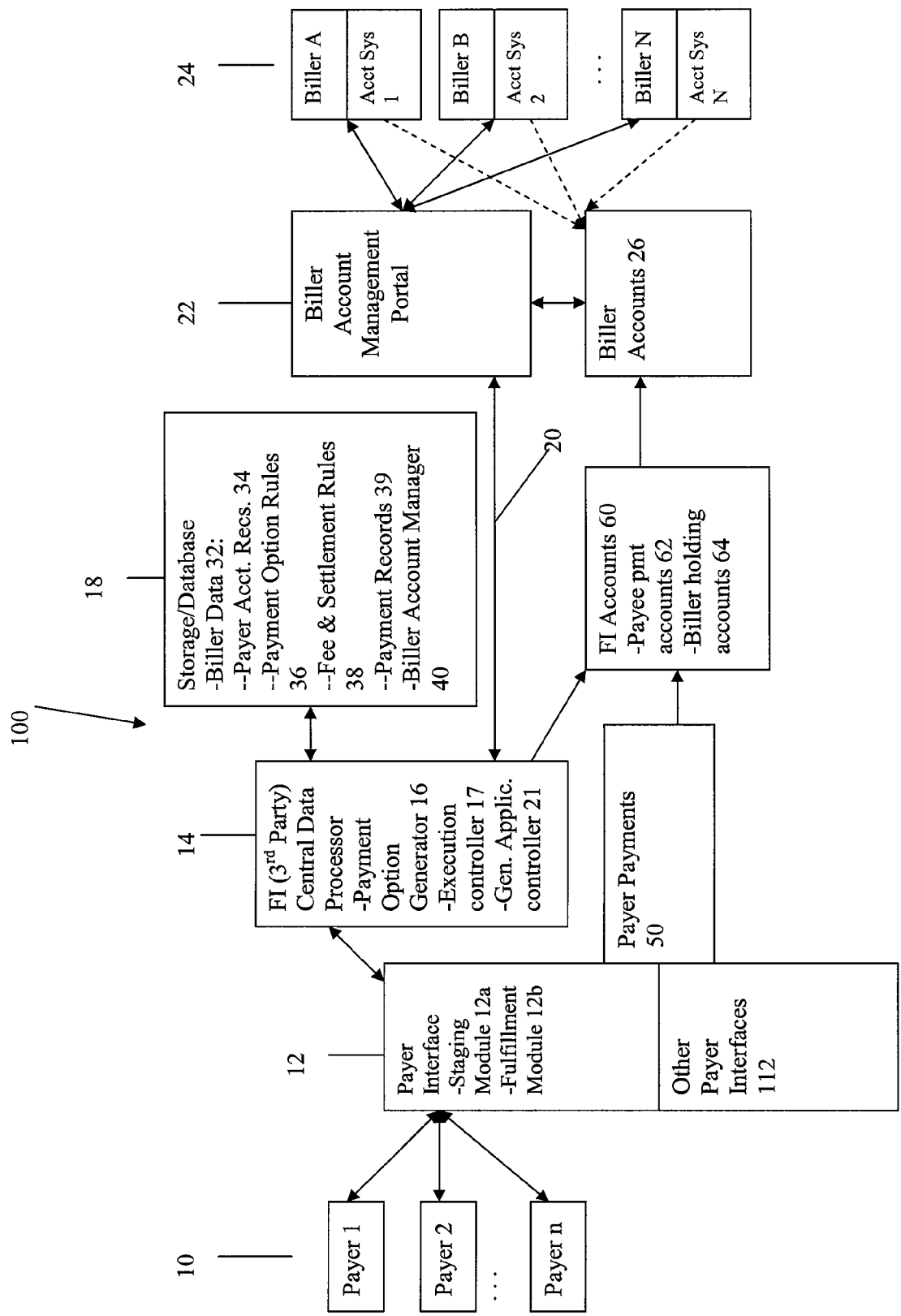
FIG. 1 is a schematic block diagram of a system for performing third party bill payment transactions in accordance with one embodiment.

Introduction. A computer-implemented method and system for bill payment with variable payment options is provided.

A financial institution (FI) (bank or non-bank) may have systems for making certain money transfers. FIs may offer, as part of a money transfer system, bill payment to specific billers with whom the FI has a relationship. A non-bank FI (NBFI) may have well-developed money transfer systems and methods effective for money transfer by persons that do not have conventional checking or other payment accounts. Such systems and methods may be suitable also for a payment transaction whereby a payer may send money to pay a biller account for that payer. In some embodiments, the biller may be one of a list of billers that have developed a payment processing arrangement with the NBFI. Such billers may be utilities, car purchase financing organizations and the like. For example, Jane Doe may wish to make a payment on her account with the electrical utility using an NBFI, because she has no banking relationship. This class of system may be referred to as a third party bill payment system. The NBFI acts as a third party between the payer and the biller to facilitate payment, when the payer cannot or does not wish to make the payment by check, money order or delivery of another payment instrument to the biller. Conventional FIs also may offer such third party payment services to customers. In the following, we will refer primarily to FIs, which will be deemed to mean either conventional FIs or NBFIs, in each case using the methods and systems described.

The FI expects to be paid for its role in the payment transaction. Thus, the bill payer may be required to pay a total amount that includes a fee in addition to the billed amount paid to the biller. Alternatively, the payer pays all or a portion of the amount due, and the biller and the FI have an agreed arrangement as to the FI's fee to be taken from that payment or from some aggregate group of payments. Thus, in the past, the payer usually has only one option offered to him/her: a billed payment amount plus a transaction fee, or a billed payment amount with no visible, separate transaction fee.

An FI may increase the value of its services and attract more billers and payers with an expanded set of bill payment options. The system and method described below permit the FI to collaborate with the biller to offer bill payment options that let the biller adapt the payment options to the circumstances of the payers and also to the circumstances of the biller.

The starting point for such a bill payment system is that the biller has electronic account records covering the payers that biller has billed and that might make a payment through the present third party payment service (e.g., customer accounts for the customers of a utility, a retail store chain or an automobile seller who provides financing, with payments due at intervals). Such records state for each payer account a billed amount and the nominal bill due date for paying that amount (but may contain other information about the payer account), and can be made available electronically to the FI/third party payment service. The records available to the FI may be the same as the records the biller uses for its billing (e.g., by mailed bills) and may be electronically shareable with the FI providing payment services. Electronic sharing permits the FI/third party payment service provider to have available, up-to-date amount and due date information for payers that use its system. It may be desirable for the FI to have access to the account records of potential payers as stored by the biller on the biller's systems or for the FI to store a copy of relevant portions of these records. The FI, as third party provider of bill payment services, uses its FI central/third party computer system to access payer account records when a payer wishes to use the FI's third party payment services. As will be described, the data in these records may be used to develop and present to a payer at least one payment option from variable payment options defined within the FI's bill payment system.

The variable payment options themselves are defined in one of more sets of biller payment option rules. With the present system and method, the biller and/or FI define payment option rules that fit the biller's approach for collecting its accounts receivable and accommodate the FI's need for payment for its services. The rules must be compatible with the FI's facilities for interacting with customers and must also be consistent with any applicable regulatory schemes for consumer credit and debt collection and the like. In a data processing system of suitable speed and capacity, appropriate payment option rules of many kinds may be programmed and implemented as software modules and/or data structures in the FI's data processing systems. In one embodiment, the payment rules are based on a time-line that includes dates preceding the nominal bill due date and extending for some time after it. That is, the payment option rule applicable may vary according to where on the time-line the payer makes the payment. For example, a biller may have a set of payment option rules that compare the payer's actual or proposed payment date using the FI payment service to the payer's nominal (i.e., previously notified) bill due date, to develop and select among possible payment options and then cause the system to present one or more of these options to a payer who contacts the FI seeking to make bill payment through it. The rules may define a number of different payment windows, corresponding to different time intervals associated with different payment options, before, including and after the nominal bill due date.

In another embodiment, the biller and/or FI can reference data other than the nominal bill due date and amount due as part of applying the option rules to define or select payment options to offer the payer. For example, the biller may wish to consider historical billing and payment records for a particular payer (customer) as part of determining the payment options to be offered. The biller also may wish to vary the payment option rules and resulting options by season, e.g., with more favorable fees or interest rates for post-holiday billed amounts or to coincide with payers receiving tax rebates. The rules for developing payment options may be developed in a collaboration by the FI and biller. Depending on who has the greater experience or customer insight, the FI may propose the payment option rules that are most effective and implementable within its system. Alternatively, the biller may have a desire to shape the rules to fits its policies toward its customers.

Application of the payment option rules may result in a payment option involving a single, undifferentiated payment amount, responsive to the payment amount due on the biller's account records for a particular payer. Alternatively, the payment option rules may result in a payment option that states a payment amount and a separate fee component. Further alternatively, the payment option rules may result in a payment option that states a payment amount, a separate fee component based on use of the FI/third party payment system and one or more other components, such as a late charge, additional interest, or other amount.

The payment option may most often vary based on the date of payment relative to the nominal due date of the bill. With varying payment options and multiple payment options available in some circumstances, a biller and/or FI may incent a payer to pay early but may still offer the option of paying later. Thus, a payer may choose between speed of payment posting and cost of transaction. Additionally, a biller may provide different payment options by allowing convenience payments as well as urgent payments (likely higher-priced), e.g., where repossession or other extreme consequences might follow failure to pay.

In addition to the biller payment option rules, the FI and biller may agree on, and the FI system implement, biller-FI fee and settlement rules. The fee paid to the FI may be the same as a separate fee component identified in a payment option. However, the FI's fee also may be a portion of the fee quoted to the payer or that fee plus an additional amount taken from the principal billed amount. The fee to the FI may consist of a single fee per payment transaction or it may have two or more components. The separate components may or may not be made visible to a payer. For example, a fee may be charged by the FI for performing the money transfer (the "transfer fee") and a fee may be charged by the biller for receiving the bill payment via this channel or at a late date (the "biller fee"). This can be shown as two separate fees or a single fee amount.

In addition, the FI and the biller may have a fee arrangement between themselves, which is not connected to individual payments but rather to an aggregate amount of payments over a time period, and it may vary by the size of the aggregate amount. (For example, the FI might get a 1% fee on the first $1 million in payments, and 0.8% of the payments thereafter.) Various sharing formulae and rate schedules may be applied to amounts the FI collects for a biller and used to determine the FI's fees; these biller-FI fee and settlement rules may be implemented as software modules or data structures in the system.

The biller-FI fees earned will be tracked in accordance with the applicable rules for individual transactions or for whatever transactions are aggregated for a fee computation per the fee and settlement rules. At intervals, the biller and the FI will effect settlement as to amounts paid by payers and applicable fees for such payments. Thus, fee and settlement rules may also define when and how funds actually are transferred to a biller bank account or an FI account, e.g., daily or weekly transfer by ACH, by wire transfer or by mailed check, to effect settlements over a defined period.

Payment Processes Overview. Bill payment through a conventional NBFI system may comprise two phases from a payer and NBFI viewpoint: (1) staging, during which parameters are set for the payment, based on one or more payment options offered, but no funds are exchanged, and (2) fulfillment, during which the payer funds the transaction to the NBFI (or its agent) and the NBFI takes the desired action to credit a biller account. (See, e.g., U.S. Pat. No. 7,258,268, titled "Method and Apparatus For Money Transfer). Thus, in practice, after specifying the bill payment transaction parameters and creating a record in an NBFI data center (staging), for fulfillment the payer makes a cash or other payment to cover the amount paid plus any fees, permitting the NBFI to execute a transfer to the biller. As may be appreciated, amounts for any fee the payer must pay may be determined at the staging phase. It is desirable that the fee amount remains the same from staging to fulfillment, but it may be changed; for example, if a certain amount of time elapses between staging and fulfillment, a payment option staged based on a current date or proposed payment date with an associated fee may no longer be available.

Bill payment may also be done in a single session where staging and fulfillment phases occur together. This can be done where the payer is present at an agent or point of sale, which can do both staging and receive fulfillment funds. It can also occur in other circumstances where the staging payer has a non-cash source of funds that can be applied at the same time the transaction is being staged. Such a non-cash source of funds may be a debit card, a credit card, an on-line account or other funding facility that can be accessed at the same time as the other parameters of the bill payment transaction are established and entered as a record in the NBFI data center.

Execution of the payment by money transfer to the biller occurs after the FI has secured funds or has an acceptable level of risk of payment that it is willing to advance funds. In execution the biller first will be notified of payment, so that it may stop unnecessary payment notices to the payer (debtor). Preferably, the FI computer system notifies the biller of the payer's payment at a time substantially commensurate with the FI receiving payment from the payer. The biller will receive a credit in its account with the FI and at a point determined by the fee and settlement rules will have funds transferred to a biller bank account. (To the extent an FI agent has been involved in receiving the payer's fulfillment payment, the FI must make arrangements to collect those funds and to pay the agent its fees for handling the fulfillment; these arrangements are normally not part of the biller-FI fee and settlement rules.) Thus, the payer's funding of the bill payment may be followed by various reconciliation and/or settlement actions executed between the FI and biller pursuant to the fee and settlement rules and/or between the FI and its agents.

System Elements and Operation. FIG. 1 is a schematic block diagram of a system 100 for performing money transfer transactions for bill payment with variable payment options. As shown, one or more payers 10 may stage a send transaction to make a payment to a biller 24 (represented in FIG. 1 by Biller A, Biller B, . . . Biller N) using one or more payer interfaces 12 provided by the FI as a third party bill payment service provider. A payer interface 12 may receive via staging module 12a the parameters of the desired bill payment and communicates, directly or indirectly, with a central data processor 14 with a payment option generator 16, an execution controller 17 and a general application controller 21. The central data processor 14 (third party computer system) accesses storage/database 18 with: biller data 32, including Payer Account Records 34 (e.g., payer identifiers, amounts due, and nominal bill due dates); payment option rules 36; and fee and settlement rules 38. The central data processor 14 and payment option generator 16 stage the transaction based on payment options presented at the payer interface 12 and information input by the payer 10, described more fully below, and by using the payment option rules 36 of the particular biller who is to be paid; i.e., each biller may have its own payment rules, although an FI also could have one set of rules for all billers or for each class of billers (utilities, retail, gas stations, etc.). A payment staging record for each staged payment is produced by the central data processor 14 and stored with payment records 39. Staged payment records 39 are updated when fulfillment occurs, and payment records 39 may be further updated when funds received by the FI are processed in reconciliation and settlement.

A biller account management portal 22 may be provided for billers 24 to interact with a biller account manager 40 component via the FI Central Data Processor 14. The interaction of the biller account management portal 22 and the biller account manager 40 may be configured in a software module so as to allow a biller 24 to select the application of alternative sets of payment rules 36. In some circumstance the biller 24 may use the biller account management portal 22 to adjust certain parameters embodied in the payment rules 36, within ranges previously agreed between biller and FI and implemented in biller account manager software 40. In some embodiments, a real time communication link 20 may be provided between the central data processor 14 and the biller account management portal 22, as the path for communications that ultimately involve the data and software modules in storage/database 18 and on the biller computer systems (FIG. 1 at 24, Acct Sys). The biller account management portal 22 may link to each biller's 24 own accounting system (represented in FIG. 1 at 24 by Acct Sys 1, Acct Sys 2, . . . Acct Sys N), where it keeps billing records. These are the ultimate source of the Payer Account Records 34 in storage/database 18. (It will be understood that storage/database 18 might not locally store Payer Account Records 34 but rather access data as needed in one of Acct Sys 1, Acct Sys 2, . . . Acct Sys. N or may have a local copy of some Payer Account Records 34 and for updating may check the Acct Sys of a particular biller.)

When bill payment is performed in two stages, after the payer 10 stages the transaction, the payer 10 makes a payment through a second interaction at a payer interface controlled by fulfillment module 12b. The payer interface with fulfillment module 12b may be one of the other payer interfaces 112, i.e., a location different than the payer interface 12 used for staging. The payer interface 12 (or 112) used for fulfillment is controlled and defined by fulfillment module 12b, which receives payment funding confirmation and communicates, directly or indirectly, with the central data processor 14.

Confirmed payment at the fulfillment payer interface 12 (or 112) initiates execution of the bill payment transaction. Payment actions are directed by execution controller 17, which is a controller responsive to a payer's payment option selection and funding confirmation, for initiating payment to an account of the biller 24 that is to be paid by the staged and now fulfilled transaction. The payment amount, including any separate fees (which may result from fee arrangements agreed to by the specific biller 24 (identified by the payer 10 during staging) and the FI), is first placed in a payer payment account 62 (managed by an agent or a pooled account managed by the FI) and may then credited to a biller holding account 64 (a bookkeeping account of the FI in FI accounts 60) and, typically, later transferred to a bank account 26 controlled by the biller 24 who was paid. The bill payment amount, payer/account identification and associated bill payment data as stored in payment records 39 for a completed payment transaction may be either made accessible to biller fee management portal 22 or transmitted on to the accounting systems of biller 24, to permit the biller 24 to credit the payment to the proper payer account within its own records.

General application controller 21 performs control and coordination for functions and system services not handled by payment option generator 16 and execution controller 17. For example, it may perform functions such as transaction queuing, between-module communications and communications between the central data processor 14 and other external parts of the system.

In various embodiments, either of the staging and fulfillment payer interfaces 12 and 112 may be based in a phone (Interactive Voice Response—IVR or live customer service representative), a computer interacting via the web (or other communication channel), a mobile platform such as mobile e-mail unit or mobile phone, or other interface for allowing payer interaction with the central data processor 14. It is to be appreciated that the method and system described herein may be applied to any suitable payer interface 12 that will support a data interchange for staging and fulfilling a payment transaction of the kind contemplated with a reasonable degree of security. A payer interface used for staging only has staging module 12a to develop and display payment options and structure and control the staging interaction; a payer interface used for fulfillment only has fulfillment module 12b to structure and control the fulfillment interaction; some payer interfaces 12, 112 may have both modules 12a, 12b.

FIG. 2 is a table that shows at a high level the organization of some of the data in database/storage 18, in particular what may be included in biller data 32. (It will be understood that the data 31 may be organized in any suitable manner available with a conventional data base management system; thus, "data" may include a pointer or some other means of linking to actual data.) In column 210 appear the names, identification and/or biller numbers and/or other identifiers/data for one or more billers who have a relationship with the FI. In column 220 is shown the general format for payer account records 34 (see FIG. 1). For each biller in FIG. 2, there is a separate set of records 34A, 34B, . . . 34N. Each biller's records may show its multiple payers, e.g., PayerA1, PayerA2 . . . Payer An, and have various fields that identify each payer by account number with that biller, by name and address or by telephone number or other identification (see FIG. 6 below). (For privacy reasons, only an account number might be used here.)

In column 230 are the payment option rules 36A, 36B, . . . 36N for each biller. These payment option rules 36A, 36B, . . . 36N may include one or more sets of rules that may be defined in software or data structures and adopted from time to time to define the variable payment options. In column 240 are biller-FI fee and settlement rules 38A, 38B, . . . 38N, which define the fee arrangement and settlement procedures (timing/frequency, payment method, accounts used) between the biller and the FI. In column 250 are biller payment records 39A, 39B, . . . 39N, which keep track of staged payments and actual fulfilled payments that result in credits to the biller to whom the payer directed payment. Although shown here as sorted by biller, these may actually be organized by payment transfer transaction identifiers used by the FI. A stored file pooling such transactions, e.g., payment records 39 in FIG. 1, may be linked to by biller ID.

Biller Payment Option Rules. Biller payment option rules 36A, 36B, . . . 36N are used in the system 100 to define, for a particular payer and payment situation, at least one payment option from a set of payment options. The present system has variable payment options, differing in amount according to one or more variables. In a prior art system, there might be a single payment approach the FI uses for its third party bill payment services; for example, the payer pays the amount shown as due per biller records plus a fixed fee of $2.00. The FI could use an alternate approach reflecting that an electronic payment using the FI system may cost a biller less to process in than a mailed check. Here, the FI could offer that, for a timely payment (not overdue), the payer pay only the amount due per biller records, with no additional fee. With a set of computer-implemented payment option rules as permitted by the present system and method, the biller and the FI may offer different payment options to payers in different situations.

The amount and structure of the payment defined in a payment option may be varied based on a variety of data reflected in the payer account records. The data considered may include, for example, the nominal due date of the bill payment relative to a proposed (staged) or actual (fulfilled) payment date using the FI/third party service, including whether the payment is comfortably in advance of the due date, very close to the due date or wholly or partially overdue. For payments that are overdue, the biller may wish to have late fees or interest charges built into the payment or may choose to suggest clearing up an account with a payment for less than an amount previously billed as due. The latter can be done by waiving late fees or interest charges and/or by granting an accommodation that represents a discount on the base billed amount (or principal amount) without any late fees or interest charges. For payments that occur well in advance of a nominal due date, an early payment with a discount might be defined in a payment option. If the payer is staging a payment comfortably in advance of a nominal bill due date, the FI system may offer two payment options, a base amount plus a nominal fee for an early payment or a base amount plus a higher fee for a payment that is made very close to the due date. All of these payment options and others can be defined in payment rules 36A, 36B, . . . 36N implemented in software modules and or data structures. (As discussed further below, associated with each of these sets of payment option rules for a biller are biller-FI fee and settlement rules, but the fee to the FI need not be identical to any fee stated in a payment option offer to the payer.)

In one embodiment, a primary factor in defining bill payment options is the date of payment via the FI relative to the nominal bill due date, i.e., the difference (positive or negative) between the date of payment using the FI and the nominal bill due date per biller records. In one embodiment, bill payments may generally fall under three broad categories: convenience payments, urgent payments, and late payments. Convenience payments may comprise early payments and on-time payments. An early payment may refer to a payment made some period of time well before the payment due date. In some embodiments, an early payment is a payment made ten to thirty days before the payment is nominally due. An on-time payment may refer to a payment made before the payment is due but outside of the range allotted to early payments. In some embodiments, an on-time payment is a payment made two to nine days before the payment due date. Urgent payments refer to payments made proximate the payment due date. In some embodiments of payment option rules, an urgent payment is a payment one day prior to or on the day of the nominal bill due date.

Late payments refer to payments made after the payment due date. In some embodiments of payment option rules, late payments may be categorized according to days past due, such as one day past due, five days past due, ten days past due, thirty days past due, sixty days past due, ninety days past due, one hundred and twenty days past due, etc. It will be seen that the categories are flexible and may be selected by the biller and/or the FI based on their billing practices. They may also be determined based on laws and regulations about consumer billing practices. The different time intervals representing convenience payments, urgent payments, and late payments may be viewed as payment windows along a time-line. The different windows open and close as the due date approaches and passes and as late payments get later.

Figure 3:
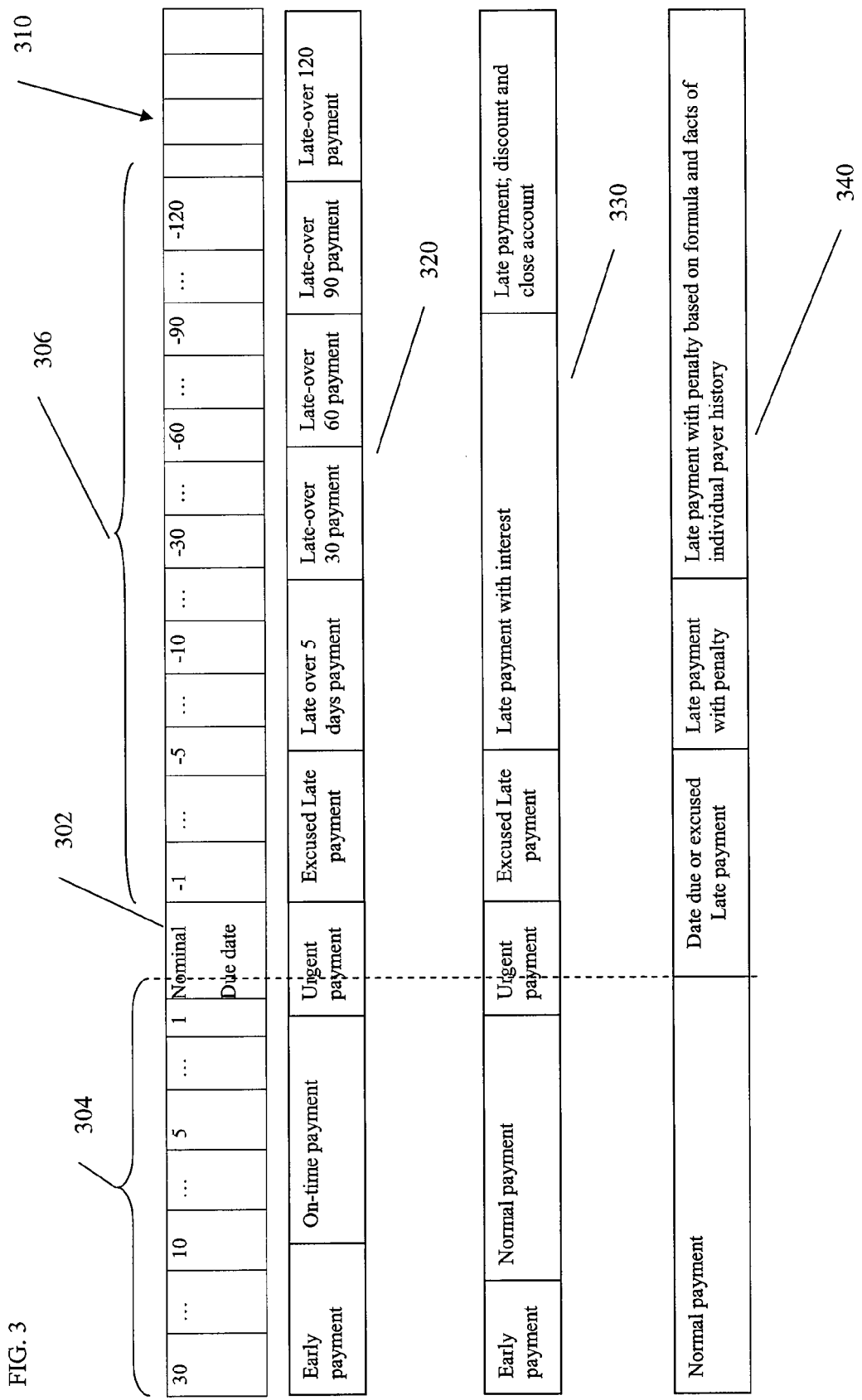
FIG. 3 is an example of a time-line showing various payment windows.

One way of viewing the payment option rules based on due dates is in terms of a predetermined set of payment windows with corresponding payment option definitions. FIG. 3 shows a set of payment windows that may be defined for payment option rules in a third party bill payment system. As can be seen, the time-line 310 of days may include the nominal bill due date 302, a sequence of days 304 preceding the due date and a sequence of days 306 following the due date 302 (indicated by minus signs preceding the numbers). Various segments of the sequences of days may be identified by somewhat arbitrary window labels, associated with the payment option definitions. For example, a first set of labels appears in row 320 below the time-line 310 of days. These window labels include: early payment, on-time payment, urgent payment, excused late payment, late over 5 days payment, late over 30 days payment, late over 60 days payment, late over 90 days payment, and late over 120 days payment. A second and a third set of window labels appears in rows 330 and 340 of FIG. 4, respectively, further below the time-line 310 of days. The second and third sets of labels are somewhat simpler than the first set 320, but still contain multiple windows and thus also provide a basis for varying the payment options, one or more of which can be presented to a payer who is planning a payment. As can be seen, while these window labels in window sets 320, 330, 340 are rigorously defined for purposes of a specific implementation of the payment rules 36A, 36B, . . . 36N and other data processing, the categories are flexible and permit virtually any definition, (unless determined by law or regulation). This permits the biller and FI to define a variety of payment windows with which payment options may be associated.

FIG. 4A shows a hypothetical set of payment option rules 400a for a biller, e.g., BillerA in FIG. 2, that may be set up based on the payment windows in the first row 320 below the timeline in FIG. 3. These payment option rules define various payment options, each corresponding to a payment window. They also show the way a payment made within any of the defined windows is to be handled. As can be seen for this example, each payment window in column 410a has a corresponding fee amount in column 420a, and a sub-rule/formula in column 430a for handling the principal amount. For example, if a payer with a $100 bill wants to make an early payment (and inquires at an interface 12 sufficiently in advance of the nominal bill due date), the payment option rules of FIG. 4A lead to a payment option with a $5 fee and a discounted principal amount of $100−2%×$100=$98, or a total of $103. If that same person wants to make an on-time payment, the payment option rules lead to a payment option with a $5 fee and the full $100 principal amount due, totaling to $105. A payer who approaches the FI early enough can be offered both the early payment option and the on-time payment option, if the payment option rules specify offering multiple options at one time.

There is also an "other action" field in column 440a to specify other features of the payment option rules that define a payment option for a given window and make it vary from the rule for other windows. Per such an "other action" payment option rule, an "on-time" payment option might in some circumstances call for an account credit for the payer's account for future purchases from the biller 24 as part of the payment option. In another "other action", it could also be specified that the biller may waive a late fee accrued that would otherwise be associated with payment of the bill. See, e.g., the "late over 90 payment" option in FIG. 4A.

In most circumstances the payment option rules will function the same for all payers falling into a particular payment window of a particular biller; the option amount offered will differ according to the amount of the outstanding bill, but the rule/formula applied will be the same. However, the payment option rule set also may provide an "individual action" field in column 450a. This calls for the system (via payment option generator 16) to check the data for an individual payer and permits the system to derive some variation of the payment option rule for a particular window as applied for a particular payer. This field defines the way in which the rule for a window may vary, based on specific payer data that may be found in the payer account records 34 or may have to be sought in the accounting system of a biller 24. For example, this individual action field might trigger a review of that particular payer's billing history to determine the number of past on-time payments made. This could be used for an individual adjustment of the payment amount otherwise defined by the payment option rule. It might also flag the particular payer account record for an action at a later time, such as review of the principal amount shown as due, or an action solely within the biller system, such as adjustment of a credit limit established by the biller 24 for that payer.

In case where an "other action" or "individual action" is used to formulate a payment option and a payment occurs based on that option, the payment data sent to the biller 24 need to contain the data necessary to update the biller's Acct Sys records to reflect the credit or other result of application of the payment option rules that adjusts the payer account.

FIG. 4B shows an alternate hypothetical set of payment option rules 400b. This may be a second set of rules available for one biller (e.g., a second set for Biller A) or a rule set for another biller, e.g., Biller B. As can be seen, the hypothetical example of FIG. 4B has fewer payment windows defined. The rule set is similar to that in FIG. 4A. However, the rule set of FIG. 4B has a late payment category with a discount on the entire bill accompanied by an account closing action. Also, the fee and settlement rules on two late payment categories use a percentage of the payment amount to define the FI fee rather than a stated dollar amount. FIGS. 4A and 4B are examples, and other rule sets may be defined incorporating other strategies for attracting payment traffic and increasing collections.

FIG. 6 shows a general schematic diagram for the biller-payer account data record 634 of a particular payer. The particular contents of this record provide the data that may be referenced by the payment option rules when an "individual action" sub-rule appears in the field in column 450a or 450b. FIG. 6, by way of a hypothetical example of fields includes, account no. 610, customer name and contacts 612, FI loyalty program status 614, current billed balance 620, nominal bill due date 622, detail of current balance 630, payment history 632, settlement offer history 634, collection analysis recommendation code 636, stop code 640 and prepay code 642. Various parts of the data in a biller-payer account record 634 may be values that are used in the application of a payment option rule when the payment option generator 16 is used for a particular payer payment inquiry. Some values are always used to compute the options and some are used only where the rule has an "individual action" sub-rule. For example, if the payer record includes data showing the person to be an otherwise prompt paying customer, application of an individual action sub-rule to such a payment history may result in a payment option more favorable in amount.

The last three fields of FIG. 6 may require explanation, as they provide certain information that may be accessed by the payment option generator 16 during the interaction to stage or fulfill a payment option. The collection analyst recommendation code 636 is a value resulting from review of the account by an analyst (human or automated) as to how the account should be handled. The code for the current analysis result is stored here and may correspond to: defer any special action; settle with a discounted amount; accept any payment and write off balance as uncollectible; or another conclusion resulting from the review. The stop code 640 has to do with situations where a biller may need to determine whether there are legal or other consequences from accepting a payment. For example, it may need to reject certain late payments on a mortgage to avoid prejudice to its rights. Alternatively, it may need to reject all payments other than a payment of the exact amount due, or it may be able to accept any payment. The prepay code 642 determines whether a prepayment, i.e., a payment of any amount greater than that due at any given date of payment is acceptable. For example, a payer might wish to make a prepayment on a mortgage in order to save interest, or to prepay an amount expected to be due in the next month, when the payer will be traveling and would not have the ability to initiate another bill payment by the periodic monthly due date. The biller may or may not wish to accept such prepayments, with that position coded here for access by the payment option generator 16.

Biller account management portal. Referring again also to FIG. 1, the biller account management portal 22 may permit a biller 24 to change or modify certain aspects or parameters of the payment rules 36. Such changes or modifications may include selection of an alternate set of payment option rules or modification of existing ones. (Any such changes would have to be acceptable under applicable laws and regulations.) For example, a retailer may have a set of payment option rules for immediate post holiday payments, to let payers pay later without severe penalty. For a further example, a biller 24 may want to add or adjust a discount amount (e.g., the 2% early payment discount in FIG. 4A) or an interest rate (the X % shown in FIG. 4A) or the amount of a credit in an "other action" rule used in a payment window. Absent prior agreement (e.g., a promotion reducing the early payment fee), the fees in column 420 of FIG. 4 will not be adjustable by a biller 24 or the FI unilaterally. However, a properly constrained portal 22 and biller account manager 40 may allow a biller 24 or the FI to adjust other payment parameters. For example, the biller 24 may adjust fees in column 420 within ranges, so long as a minimum fee remains available for allocation to the FI, or the FI may offer a promotional lowered fee or to payers at certain levels of the FI loyalty program (see FIG. 6 at 614), so long as a minimum fee amount remains available for allocation to the biller. (In these cases it is assumed the fee and settlement rules 38 require that a share of the fee from a payer in column 420 goes to the biller and the FI. If there were no sharing, the party affected may be free to adjust a fee that affects only it). Operation of the account biller management portal 22 may also require implementing rules as to the effective time for any changes made, so that these are transparent and orderly in accordance with the expectations of the FI and biller 24. For example, a biller 24 might need to request a discount change a certain time period in advance of its use and the system would not implement it until it had been properly noticed and the time period had passed. All such constraints required by the FI may be implemented in the software of biller account manager 40 and/or account biller management portal 22.

FIG. 7 shows a schematic example of a screen layout 700 for a screen of the biller account management portal 22. The screen may be tailored to the management options available to each biller. In the example, the screen shows the Available Payment Option Rule Sets 710 and their status 712. Set A is shown as selected; set B is shown as available for selection; set C is shown as under development, meaning that it is being formulated and negotiated by the FI and biller. It will not be available for selection until completed, but may, for example, be viewed.

A second part of the screen 700 shows the parameters available for adjustment for the selected payment option rule set 720. As can be seen, a first row 722 identifies the particular rule set, and labels the current value and new value columns. The second through fourth rows 724, 726, 728 show the parameters to be adjusted, each with its current value and an example of a new value that may be specified.

A third part of the screen 700 shows the reports that may be requested by the biller at the portal 22. Thus, the report request form 730 permits the biller user to specify a requested report by: time period for the report to cover; the report type, which may be selected from a drop-down menu (not shown); and a requested delivery date.

FIG. 7 is merely an illustrative example. Other screen designs based on principles known in the art of graphical user interfaces may be used to permit control by and information exchange with a biller who is using the FI system.

Payment Option Generator. When a payer approaches a payer interface 12 to explore or arrange bill payment using the FI third party payment services, there is an exchange of information at that interface. The interface may be a series of screens presented to the payer or an FI agent with whom the payer is interacting, or the interface may be call center personnel at computer screens, IVR prompts, smartphone screens or other means of information exchange used in a user interface 12. The purpose of the exchange is to identify the payer's payment outstanding, present the payer at least one payment option and to set up an option as a staged bill payment transaction or complete a fulfilled bill payment transaction. This interaction is based on the functions coded into the payment option generator 16 and its interactions with Biller Data 32 and the payer interface 12.

Figure 5A:
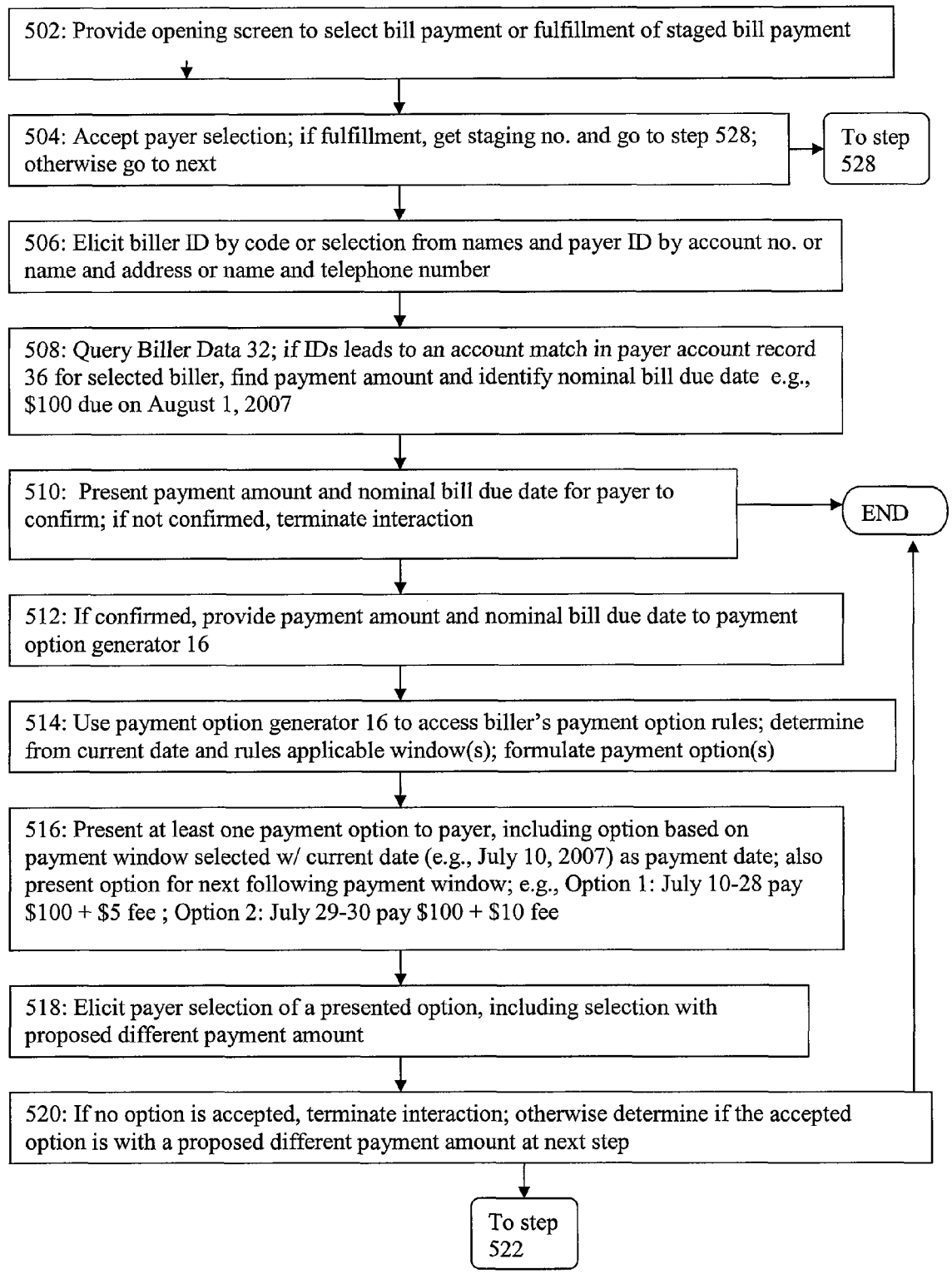
FIGS. 5A, 5B and 5C are a flowchart showing one embodiment of a bill payment method.
Figure 5B:
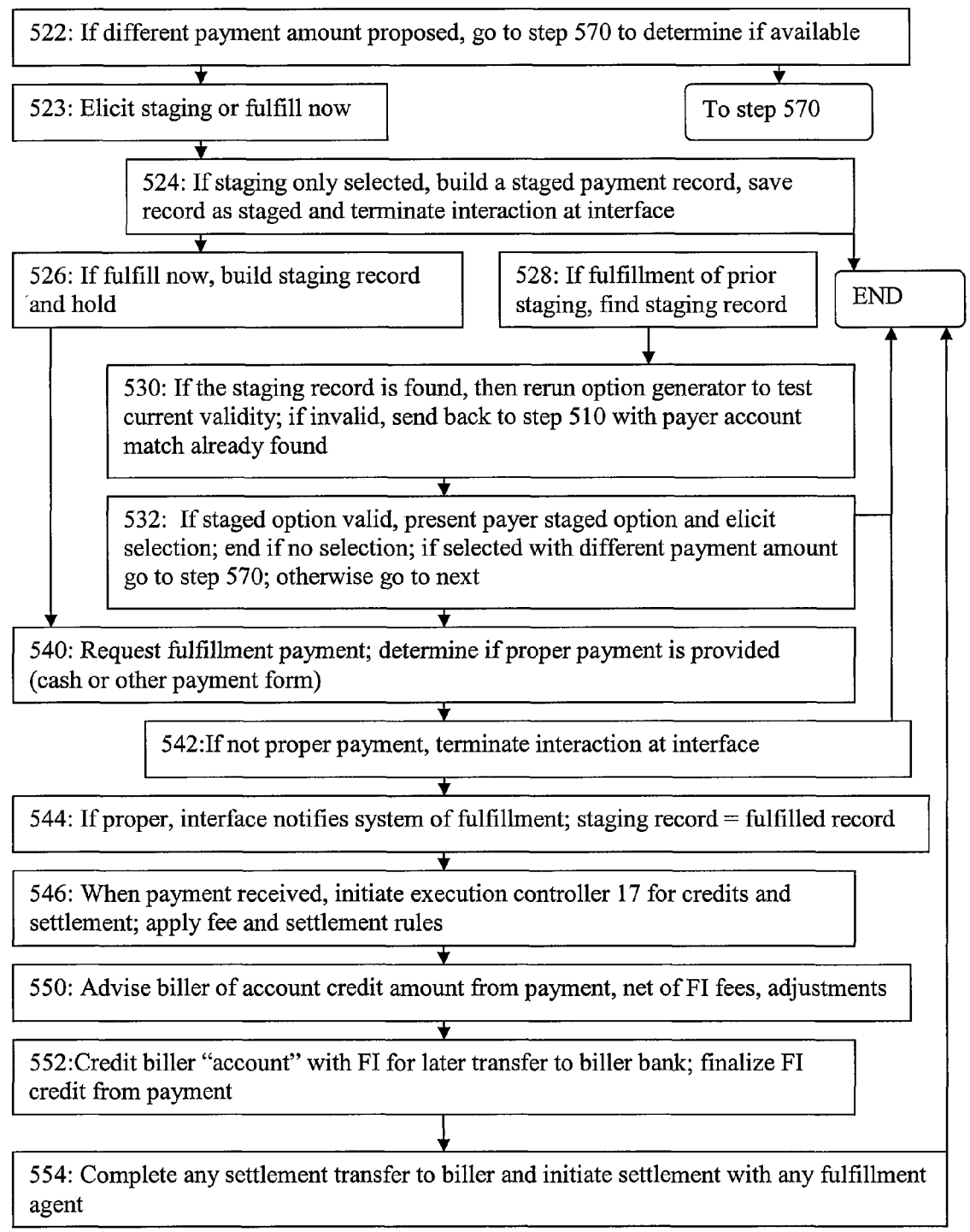
Figure 5C:
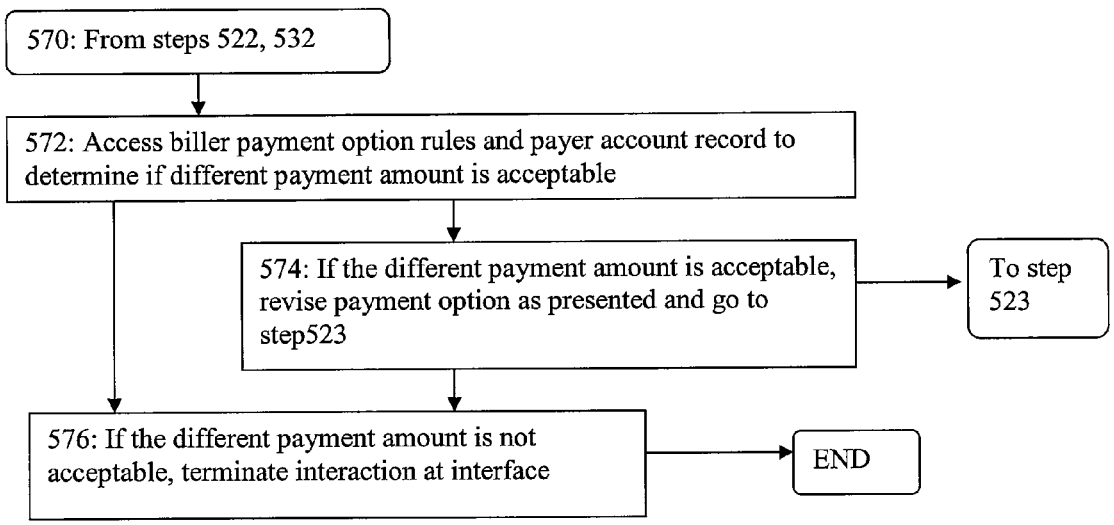

In FIGS. 5A-5C is a flowchart describing at a high level the activity centered around the payment option generator 16 in one embodiment. By way of example of one interface, the flowchart assumes that there is a screen for displaying information to the payer or to an FI agent who is interacting with the payer. Generally the same interaction would occur with a IVR interface or with a call center person working at a computer screen, but be recast for those interfaces. As seen in FIG. 5A, at 502, the system provides an opening screen allowing the user to select bill payment or fulfillment of a previously staged bill payment. At 504, the interface accepts a payer selection. If the payer is performing fulfillment, the interface 12 elicits the payment staging number (or information that may assist in finding a staged payment record) and goes to step 528; otherwise the system moves to step 506, where the interface elicits data for the payment option generator 16: biller identification by code or guiding the payer to make a selection from biller names, and payer identification by account no. or name and address or other contact, such as telephone number, that may help find the correct payer account record 34 within information from the biller 24. (In some embodiments, a payer 10 may set up an account or profile with the FI such that the payer 10 need not re-enter identification information for each bill payment.) At 508, a payer account record is sought by query to Biller Data 32; if the biller and payer account information leads to an account match in payer account records 34 for the selected biller, the payment option generator finds the current payment amount (balance due) and identifies the nominal bill due date, e.g., payer account may show $100 due on Aug. 1, 2007. At 510 the interface presents a payment amount and nominal bill due date for payer to confirm; if these are not confirmed, then the interface terminates the interaction. If the payment amount and nominal bill due date are confirmed, at 512, the system provides these to payment option generator 16.

At 514 the payment option generator 16 software is used to access the applicable biller's payment option rules among those available 36A, 36B . . . 36N. With these, it determines from the current date and rules the applicable payment window(s) and formulates payment option(s) Typically this will be done by computing the applicable payment window(s) and applying the corresponding option rule to the payer's current payment amount due.

At 516, the interface presents at least one of the variable payment options to the payer, including an option based on the payment window computed using the current date as payment date; the interface may also present the computed option for next following payment window. A payment option will include a total payment amount and may break out the fee portion and the principal payment portion. The principal payment portion may be a previously billed amount, a discounted previously billed amount or a previously billed amount adjusted with interest or other late fees that may not have been billed before but may be part of the payment option pursuant to biller payment option rules. For example, with a payer inquiring on a current date of Jul. 10, 2007 and having $100 due on Aug. 1, 2007, the options presented based on the on-time payment and urgent payment rules in FIG. 4A may include: Option 1: July 10-28 pay $100+$5 fee ; Option 2: July 29-30 pay $100+$10 fee.

At 518 the interface elicits payer selection of a presented option, including (in one embodiment) selection with proposed different payment amount. This may be of interest if the payer does not have the ability to fund the fill amount due or if the payer wishes to make a prepayment. At 520 if no option is accepted, the interface terminates the interaction; otherwise, the system determines if the accepted option is with a proposed different payment amount at next step 522. At 522 (FIG. 5B), if the payer has proposed a different payment amount than was calculated for the selected option, then the system goes to step 570 (FIG. 5C) to determine if the option with a different payment amount is available.

At 572, the system accesses the biller payment option rules 36 and, as needed, the payer account records 34 to determine if the proposed different payment amount is acceptable. For some billers, it may never be acceptable; this is coded into that biller's payment option rules 36. For some billers it may be acceptable, but this may depend on the status of the individual payer, and whether the payment is less than as defined in the option generated or is more, as with a prepayment. Action may depend on the values coded into the stop code 640 and the prepay code 642 (FIG. 6). At 576, if the proposed, different payment amount is not acceptable, the system terminates the interaction at interface 12. At 574 if the different payment amount is acceptable, the payment option generator will revise the generated payment option as first presented to the payer and go to step 523 to continue.

At step 523 (FIG. 5B), the interface elicits whether the payer is doing only staging or wants to fund the bill payment and fulfill it now. At 524, if the payer selects staging only, the system builds a staged payment record, saves the record as staged and terminates interaction at interface 12. At 526, if the payer selects fulfill now, the system builds a staging record and holds it for further steps toward fulfillment, continuing at step 540.

If the payer indicated at step 502 that he/she was fulfilling a previously staged bill payment, then the payer will also need to reach step 540, but there are preliminaries. These begin at step 528, which assumes prior staging and causes the system to find the prior staging record. At 530, if the staging record is found, then the system reruns option generator 16 using the current date to find a new payment option based on the current date and test the current validity of the option as previously staged; if the staged option is no longer valid, then the payer is sent back to step 510 (FIG. 5A) with a payer account match already found. Thus, the system can resume with a new payment option based on the current date. At 510 the interface presents a payment amount and nominal bill due date using the new payment option based on the current date for payer to confirm; if these are not confirmed, then the interface terminates the interaction. At 532 if the staged option is still valid, the system presents the payer the staged option and elicits selection for fulfillment; the interface interaction ends if there is no selection; if the option is now selected with a different payment amount, the system goes to step 570 (FIG. 5C); otherwise it proceeds to step 540.

At 540, the system has a payer who has elected fulfillment. Accordingly, the system requests a fulfillment payment and then determines if proper payment is provided (cash or other payment form). For example, with an agent assisting the payer, this would be based on the agent confirming receipt of the proper amount of cash. At 542 if there is not proper payment, the system terminates interaction at interface 12. If the payment is proper, at 544 the interface notifies the system of fulfillment, and the bill payment staging record is updated to a fulfilled payment record. At 546 when payment is received, the system initiates execution controller 17 to proceed with the credits and settlement actions, applying fee and settlement rules. At 550, the system issues a message to biller of the account credit amount from the bill payment that was received, net of FI fees and any other agreed adjustments. At 552 the system credits a biller "account" with FI for later transfer to a biller bank account and finalizes the FI credit earned from handling the bill payment as third party service provider. At 554, the system completes any settlement transfer to biller and initiates settlement with any fulfillment agent, to complete the action on this bill payment.

The information provided to the payment option generator 16 in the process of FIGS. 5A-5C) may include payer identification information, biller identification, the payer account number to which the payment is to be posted, the proposed payment/transfer amount and a proposed payment fulfillment date. The payment option generator 16 may generate options by computing the difference between the current date (taken as the proposed payment date) and the nominal bill due date, including whether the bill is not yet due or is overdue. If the payment option generator 16 is used in staging, a later proposed payment date may be used instead of the current date. The payer proposes a date based on the expected fulfillment date. The payment option generator 16 may then generate options by computing the difference between the payer's planned fulfillment payment date and the nominal bill due date. For example, if the payer 10 has input a specific date for payment (i.e., the date of proposed fulfillment), the payment option generator 16 may provide a single option with fees for payment on that date, the fees being generated based on the amount of time between the proposed fulfillment payment and nominal bill due date. Alternatively, if the payer 10 has not input a specific date for payment, the payment option generator 16 may use the current date to provide a plurality of options, including payment window date ranges, amount of fees, and principal payment amount including any discount. The fee components are generated based on payment rules 36 of the biller and the amount of time between various possible payment dates and bill payment due date.

Based on the biller's payment option rules 36, the plurality of payment options generated will typically have associated timing windows that the payment option generator 16 uses. For example, for payment 6-10 days early, the payment option may be the bill amount with a first fee amount added; for payment 2-5 days early, the payment option may be the bill amount with a second fee amount added; and for payment 1 day early or on the bill payment due date, the payment option may be the bill amount with a third fee amount added. The payment option generator 16 may further apply a payment rule to provide a discount, such as a discount for early payment. Such discount may be a reduction of the billed amount or the transaction fee. In the case of late fees, the reduction may be in the interest amount or late fee charged, or other the billed amount. The discount may be a percentage or a dollar amount.

Once the payment option generator 16 has generated from payer inputs and presented to the payer at least one option using the payment option rules 36A, 36B . . . 36N, the payer 10 is invited to accept or reject that option, or if multiple options have been generated, to specify one option. The accepted or specified payment option may be staged for payment. Transaction information from the information provided by the payer 10 and the accepted or specified payment option information provided by the payment option generator 16 may be saved in a staged payment record 39. The money transfer to make payment then is considered staged and awaiting fulfillment.

The payment option generator 16 may use any stored set of rules to determine the amount for the payment option, including the various components that are defined in the payment rules. Thus, each biller may have its own set of rules in a biller payment rule set. Further, in some embodiments, a payer 10 may arrange payment of a plurality of bills from one or more billers 24 during a single staging.

Design of the payment option rules may reflect a variety of considerations. In some instances, a biller 24 may want to encourage early bill payment. Thus, the fee may decrease, when there is a larger difference between early payment date and the nominal bill due date. In many instances, a biller may want extra payment (compensating for the time value of money) from a payer who is overdue; thus the payment fee may increase when the payment date is after the nominal bill due date and/or interest may be charged. Conversely, in some instances, a biller may want to encourage a past due payer to resolve a bill and thus may decrease the fee when the payment date is after the nominal bill due date and/or waive late fees associated with late payment. In some situations, a biller may want to encourage payments from a significant number of its customers based on the biller's cash needs or financial condition. For example, a biller may want to encourage payments before the end of a fiscal quarter. At such a time, a more favorable fee and/or discount structure might be offered in the range of payment options defined by the applicable payment option rules. The biller 24 may further use other incentive options, such as credits or gift cards, for incentivizing payment. The biller thus may also have flexibility in providing variable payment options that reflect promotions or react to company needs using the present system and method.

In some instances, the FI may want to encourage a payer to use FI services for bill payment (as opposed to a competitor) and thus may offer reduced payment fees. For example, an FI may offer a reduced payment fee if the payer uses the FI more than one time. Thus, the payer may be prompted at the payer interface 12 to state whether he/she has used the FI for bill payment in the past. If the payer records indicate that the payer has used the FI for bill payment in the recent past, or has achieved a certain FI loyalty program status, the payment fee may be reduced. Further, pursuant to a special arrangement with a biller, the FI may offer a reduced payment fee for all bill payments made to that particular biller.

In some instances, a biller may want to incentivize bill payment by waiving all fees associated with the bill payment, including any separate bill fee or payment fee.

In one embodiment, two or more payment options will be offered to the payer. The number of options displayed may be selected by biller and FI, based on the screen space available and judgments as to the degree of complexity a user can accept. In one embodiment, not more than three may be displayed. The payment option generator 16 may transmit or specify the available options to the payer interface 12, where these are presented for selection by the payer 10. For example, payment options offered sufficiently far in advance of the due date may include immediate payment with a lower fee and a discount from the billed amount, as well a payment of a regular fee and no discount for normal payment a few days ahead of the due date and payment of a higher fee and no discount for urgent payment a within 48 hours of the due date. Similarly, when a payer is already late, the payer may be shown an option to pay a then-current late charge and also the higher late charge associated with the upcoming late payment window, which will apply if the payment is made in a few days.

Fee and Settlement Rules. The biller rules 400a of FIG. 4A may also include the biller-FI fee rules in column 460a that determine how amounts collected are allocated between the FI and each biller 24. Although FIG. 4A states hypothetical rules, as can be seen, these are subject to agreement between the parties and may define any allocation arrangement that they deem suitable. As parameters of their relationship, they are coded into specific values in software modules, data structures and/or objects but adjustable over time as agreed by the parties. Thus, the rules and formulae for allocation shown in FIG. 4A are only an hypothetical example. (FIG. 4B shows another example at column 460*b*).

At some point after it is confirmed the payer 10 has made the payment, the FI transfers funds, including the principal amount and any biller's share of fees, to an account 26 of the biller, effecting completion of the money transfer. Completion of the money transfer may be substantially concurrent with fulfillment by the payer. Alternatively, completion of the money transfer to the biller may be delayed from fulfillment of the money transfer by a predetermined period, e.g., 2-7 days.

There is a time value associated with money. Thus, when the funds paid by the payer 10 are transferred to the biller 24 promptly after the date of payment by the payer, the time value of the funds inures to the biller 24. In contrast, when the funds paid by the payer are transferred after a holding period, at least a portion of the time value of funds inures to the FI. Determination of when transfer is made to the biller 24 may be done pursuant to an agreement between the FI and the biller. This action dictated by this agreement may be implemented in the set of biller-FI fee and settlement rules 460*a*, as a further set of rules that specify how and when the parties' allocated portions of payments will be settled. In some embodiments, payment to the biller 24 may be done for each payment received from a payee. In another embodiment, aggregated payments may be done to a biller for payments made within a certain time period, for example on a daily or weekly basis. Payments to a biller may be done in any suitable mode, such as through an automated clearing house (ACH) credit or by wire or check.

Validation and Fulfillment. It will be seen that large numbers of payment transactions may be made using the present system and that funds may be pooled. Accordingly, it is important to have some safeguards against user error that might result in payment to the wrong biller. To reduce error, the FI may require a specific biller ID be selected in staging, ensuring that the payment will go to an entity that is a participant in the system and use the biller ID to validate information provided by the payer 10 at the payer interface 12 against biller data 32. Generally, the FI may validate an account number of the payer, a payment amount due, and or a payment due date. The payer may provide the amount due and due date for the FI to validate. Alternatively, the FI may locate in the biller records 32 what seems to be the corrected data and present these to the payer for confirmation. In some embodiments, validation may be substantially concurrent with payer's provision of the staging information and may be in real time via a connection (not shown) with the accounting system of a biller 24. (See FIG. 5A at step 508.) In some embodiments, validation may be via a validation file provided by the biller 24 some time after staging the transaction. Generally, validation is performed during or after staging and before fulfillment of the transaction.

In one embodiment, the FI/third party service provide receives as payer account data to initiate a payment transaction a biller identification and an account identifier that is an account number. In another embodiment, the FI/third party service provide receives a biller identification and an account identifier that is not an account number, but may be a payer name and address or telephone number. In this case, verification may require some significant searching and matching algorithms to help assure that payments go only to the proper payer account.

Once a two phase transaction has been staged, the payer 10 uses a payer interface 12 for a fulfillment payment, initiating fulfillment of the money transfer. The payer may make a payment by going to an agent terminal, applying money online, or other methods. Fulfillment creates what in an NBFI money transfer system is called a committed send record. In some instances, a staged transaction may be restaged. For example, if too much time has passed between staging of the transaction and expected fulfillment of the transaction, the payer may be prompted to restage the transaction to, for example, receive new fee values.

Example—Walk-In Bill Payment. Bill payment may be done as a walk-in payment. In this scenario, a payer goes to a physical FI location to stage and fulfill the money transfer. At the physical location, the payer interacts with an agent or customer service representative (CSR) and his/her terminal as the payer interface 12 of FIG. 1. The CSR thus may enter information from the payer such as payer identification information, biller identification and the account to which the payment is to be posted, the proposed payment/send amount, and a proposed payment date. The CSR validates the information received from the payer. Such validation may be real time via a telecommunications link, for example via web or phone, with the biller data 32. Generally, validation may be done by using an account number provided by the payer to look up a due date on a validation file from the biller data 32.

The CSR inputs the information and the information is transmitted to the central data processor 14 and used by the payment option generator 16 to formulate and display payment options for the payer. The payment options may be generated based on the difference between the payment date and the bill payment due date or may be generated based on other considerations by the biller or the FI. The payer selects one of the offered payment options. The CSR then creates a bill payment staging record based on the information provided by the payer and the payment option selected by the payer. The payer then or later submits payment, typically at an agent location, effecting fulfillment of the money transfer. The CSR then creates a committed bill payment transaction record. The FI provides a receipt to the payer.

The FI transfers funds, including the principal payment amount and any shared portion of fees to the biller. Such transfer may be substantially concurrent with the payment by the payer or may be delayed from payment by the payer.

Example—Electronic Payment. Bill payment may be done as an electronic or on-line bill payment transaction. In this scenario, a payer logs onto a website of an FI or a biller linked to an FI website to stage and optionally fulfill the money transfer. The user enters information to the website via a browser, including, for example, payer identification information, biller identification and the account to which the payment is to be posted, the proposed payment/send amount, the bill payment due date, and a proposed payment date. The information from the payer is validated. Such validation may be real time via a telecommunications link, for example via web or phone, with the biller date 32. Generally, validation may be done by using an account number provided by the payer to look up a due date on a validation file from the biller data 32.

The input information is transmitted to the central data processor 14 and used by the payment option generator 16 to formulate and display payment options for the payer 10. The payment options may be generated based on the difference between the payment date and the bill payment due date or may be generated based on other considerations by the biller or the FI. The payment options are transmitted to the payer and the payer selects one of the payment options. A bill payment send staging record is created based on the information provided by the payer and the payment option selected by the payer.

The payer may select to submit payment online from a bank account available on-line, via credit or debit card, etc., effecting fulfillment of the money transfer. A committed bill payment send transaction record is created. The FI provides a receipt to the payer on-line or via email, SMS, or other communication mode.

The FI transfers funds, including the principal payment amount and the bill fee to the biller. Such transfer may be substantially concurrent with the payment by the payer or may be delayed from payment by the payer.

Although the present invention has been described with reference to preferred embodiments, persons skilled in the art will recognize that changes may be made in form and detail without departing from the spirit and scope of the invention.

We claim:

1. A system for third party bill payment services used by a payer to pay a biller with whom a payer has an account, comprising:
   a third party computer system for accessing biller data from a plurality of billers, the biller data for the payer in relation to one of the plurality of billers comprising at least one account identifier, an amount due, and a nominal bill due date;
   one or more payment option rules associated with each of the plurality of billers, the payment option rules defining variable payment options for the associated biller, at least one of the payment options including a calculation for defining a payment amount due based in part on a difference between a proposed payment date and the nominal bill due date;
   a rules management portal permitting access to the payment option rules for changing or modifying parameters of the payment option rules, including parameters of the calculation for the payment amount due;
   a payment option generator for accessing the one or more payment option rules associated with a biller and developing at least one payment option for the payer based on at least a subset of the one or more payment option rules associated with the billet wherein the at least one payment option comprises a payment amount due based in part on a difference between a proposed payment date and the nominal bill due date;
   a payer interface for staging a money transfer to make payment to the billet, the payer interface configured for presenting the at least one payment option to the payer and for accepting a payment option selection and a payment funding confirmation for the payment amount due and payment date, wherein the third party computer system builds a staging record based on the payment option selection~
   wherein the variable payment options are available for the payer to pay early relative to the nominal bill due date and to pay later relative to the nominal bill due date; and
   a payment execution controller responsive to the payment option selection and the payment funding confirmation for receiving the payment amount due, wherein the bill payment staging record is updated to a fulfilled payment record, the payment execution controller configured for applying fee and settlement rules established between the payer and a provider of third party bill payment services and initiating the money transfer to make payment to the biller's account on behalf of the payer.

2. the system of claim 1, wherein the payment option generator determines the difference between the proposed payment date and the nominal bill due date and defines a payment that is more favorable for early payment than later payment.

3. The system of claim 1, wherein the payment option generator determines the difference between the proposed payment date and the nominal bill due date and a discount is applied to an amount billed as due when the difference preceding the bill payment due date exceeds a predetermined value.

4. The system of claim 1, wherein a biller is permitted to modify payment option rules accessed by the payment option generator using the rules management portal.

5. The system of claim 1, wherein the payment option generator determines the difference between the proposed payment date and the nominal bill due date and wherein, when the proposed payment date is after the nominal bill due date, a payment option generated waives a late fee.

6. The system of claim 1, wherein the payer interface is an agent terminal.

7. The system of claim 1, wherein the payer interface is a computer connected to a global network.

8. The system of claim 1, further configured for:
   receiving from the payer at the third party computer system information including at least a biller identification, a proposed payment amount, the proposed payment date, and the nominal bill due date;
   verifying at least a portion of the received information against payer account records;
   calculating the difference between the proposed payment date and the nominal bill due date; and
   presenting to the payer the at least one payment option, wherein the payment required is responsive to the calculated difference between the proposed payment date and the nominal bill due date and the payment option rules associated with the biller.

9. The system of claim 8, further configured for receiving a selection of the at least one payment option from the payer.

10. The system of claim 9, further configured for determining that proper payment is provided based on an agent confirming receipt of a payment from the payer to fund the selected payment option.

11. The system of claim 10, further configured for crediting payment to the biller's account, the credited payment comprising an amount computed based on predetermined fee and settlement rules.

12. The system of claim 11, further configured for notifying the biller of the payer's payment at a time substantially commensurate with the third party computer system receiving confirmation of the payment from the payer.

13. The system claim 11, further configured for delivering payment to the biller at a time separate from receiving payment from the payer as determined by the predetermined fee and settlement rules.

14. A non-transitory computer readable medium encoded with computer program instructions for a third party computer system for performing third party bill payment services to pay a biller with whom a payer has an account, comprising:
   an instruction module for accessing biller data from a plurality of billers, the biller data for the payer in relation to one of the plurality of billers comprising at least one account identifier, an amount due, and a nominal bill due date;
   one or more payment option rules associated with each of the plurality of billers, the payment option rules defining variable payment options for the associated biller, at least one of the payment options including a calculation for defining a payment amount due based in part on a difference between a proposed payment date and the nominal bill due date;

an instruction module for a rules management portal permitting access to the payment option rules for changing or modifying parameters of the payment option rules, including parameters of the calculation for the payment amount due;

an instruction module for a payment option generator for accessing the one or more payment option rules associated with a billet and developing at least one payment option for the payer based on at least a subset of the one or more payment option rules associated with the billet wherein the at least one payment option comprises a payment amount due that is responsive to a difference between a proposed payment date and the nominal bill due date;

an instruction module for a payer interface for staging a money transfer to make payment to the billet, the payer interface presenting the at least one payment option to the payer and accepting a payment option selection and a payment funding confirmation for the payment amount due and payment date, wherein a staging record is built based on the payment option selection;

wherein the variable payment options are available for the payer to pay early relative to the nominal bill due date and to pay later relative to the nominal bill due date; and an instruction module for a payment execution controller responsive to the payment option selection and funding confirmation for receiving the payment amount due, wherein the bill payment staging record is updated to a fulfilled payment record, the payment execution controller applying fee and settlement rules established between the payer and a provider of third party bill payment services and initiating the money transfer to make payment to the biller's account on behalf of the payer.

15. The non-transitory computer readable medium encoded with computer program instructions of claim 14, wherein the instruction module for the payment option generator determines the difference between the proposed payment date and the nominal bill due date and defines a payer fee that is more favorable for early payment.

16. The non-transitory computer readable medium encoded with computer program instructions of claim 14, wherein the instruction module for the payment option generator determines the difference between the proposed payment date and the nominal bill due date and a discount is applied to an amount billed as due when the difference preceding the bill payment due date exceeds a predetermined value.

17. The non-transitory computer readable medium encoded with computer program instructions of claim 14, wherein the instruction module for the rules management portal permits a biller to access the payment option rules for changing or modifying parameters of the payment option rules.

18. The non-transitory computer readable medium encoded with computer program instructions of claim 14, wherein the instruction module for the payment option generator determines the difference between the proposed payment date and the nominal bill due date and wherein, when the proposed payment date is after the nominal bill due date, a payment option generated waives a late fee.

19. The non-transitory computer readable medium encoded with computer program instructions of claim 14, wherein the instruction module for the payer interface is located at an agent terminal.

20. The non-transitory computer readable medium encoded with computer program instructions of claim 14, wherein the instruction module for the payer interface is located at a computer connected to a global network.

21. The non-transitory computer readable medium encoded with computer program instructions of claim 14, the instructions further comprising:
   accessing biller data accesses payer account data of the biller using the third party computer system, the payer account data comprising the at least one account identifier, the amount due and the nominal bill due date;
   accessing a set of payment rules defined for the biller and accessible to the third party computer system; and
   controlling the payment option generator for developing the at least one payment option, wherein the at least one payment option is responsive to the difference between the proposed payment date and the nominal bill due date.

22. The non-transitory computer readable medium encoded with computer program instructions of claim 21, the instructions further comprising:
   controlling the payer interface for presenting the at least one payment option to the payer and for accepting the payment option selection and the payment funding confirmation; and
   controlling the payment execution controller responsive to the payment option selection and the payment funding confirmation, for initiating the money transfer payment to the biller's account on behalf of the payer.

* * * * *

UNITED STATES PATENT AND TRADEMARK OFFICE
CERTIFICATE OF CORRECTION

PATENT NO. : 8,744,959 B2
APPLICATION NO. : 12/191112
DATED : June 3, 2014
INVENTOR(S) : Gordon Smith et al.

It is certified that error appears in the above-identified patent and that said Letters Patent is hereby corrected as shown below:

In the Specification

At col 13, line 66,
 "fund the fill amount due"
should read:
 -- fund the full amount due --

In the Claims

At col 19, line 42 (claim 1, line 24),
 "associated with the billet"
should read:
 -- associated with the biller --

At col 19, line 47 (claim 1, line 29),
 "payment to the billet,"
should read:
 -- payment to the biller, --

At col 19, line 53 (claim 1, line 35),
 "option selection~"
should read:
 -- option selection; --

At col 19, line 66 (claim 2, line 1),
 "the system of claim 1,"
should read:
 -- The system of claim 1, --

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,744,959 B2

At col 21, line 11 (claim 14, line 24),
"with a billet and"
should read:
-- with a biller and --

At col 21, line 13 (claim 14, line 26),
"associated with the billet"
should read:
-- associated with the biller --

At col 21, line 19 (claim 14, line 32),
"payment to the billet,"
should read:
-- payment to the biller, --

At col 22, line 27 (claim 21, line 4),
"accessing biller data accesses payer account data"
should read:
-- accessing payer account data --